United States Patent
Xu

(10) Patent No.: US 9,482,101 B2
(45) Date of Patent: Nov. 1, 2016

(54) TRAILING EDGE AND TIP COOLING

(71) Applicant: United Technologies Corporation, Hartford, CT (US)

(72) Inventor: JinQuan Xu, Groton, CT (US)

(73) Assignee: United Technologies Corporation, Hartford, CT (US)

( * ) Notice: Subject to any disclaimer, the term of this patent is extended or adjusted under 35 U.S.C. 154(b) by 969 days.

(21) Appl. No.: 13/687,567

(22) Filed: Nov. 28, 2012

(65) Prior Publication Data

US 2014/0147287 A1    May 29, 2014

(51) Int. Cl.
*F01D 5/18*    (2006.01)

(52) U.S. Cl.
CPC .............. *F01D 5/187* (2013.01); *F01D 5/186* (2013.01); *F05D 2240/304* (2013.01); *F05D 2240/307* (2013.01); *F05D 2250/38* (2013.01); *F05D 2260/2212* (2013.01); *F05D 2260/22141* (2013.01); *Y02T 50/676* (2013.01)

(58) Field of Classification Search
CPC ........ F01D 5/181; F01D 5/182; F01D 5/186; F01D 25/12
See application file for complete search history.

(56) References Cited

U.S. PATENT DOCUMENTS

| | | | |
|---|---|---|---|
| 3,420,502 A * | 1/1969 | Howald .................... | F01D 5/87 415/115 |
| 4,407,632 A | 10/1983 | Liang | |
| 5,337,805 A | 8/1994 | Green et al. | |
| 5,368,441 A | 11/1994 | Sylvestro et al. | |
| 5,503,529 A | 4/1996 | Anselmi et al. | |
| 5,669,759 A | 9/1997 | Beabout | |
| 5,851,105 A | 12/1998 | Fric et al. | |
| 6,179,556 B1 | 1/2001 | Bunker | |
| 6,179,565 B1 * | 1/2001 | Palumbo et al. ........... | 416/97 R |
| 6,234,754 B1 | 5/2001 | Zelesky et al. | |
| 6,672,829 B1 | 1/2004 | Cherry et al. | |
| 6,824,359 B2 * | 11/2004 | Chlus et al. .................... | 416/92 |
| 7,008,186 B2 | 3/2006 | Heeg et al. | |
| 7,021,893 B2 * | 4/2006 | Mongillo et al. ............. | 415/115 |
| 7,175,388 B2 | 2/2007 | Labbe et al. | |
| 7,241,108 B2 | 7/2007 | Lewis | |
| 7,377,748 B2 | 5/2008 | Mongillo, Jr. et al. | |
| 7,438,527 B2 | 10/2008 | Albert et al. | |

(Continued)

FOREIGN PATENT DOCUMENTS

| | | | |
|---|---|---|---|
| EP | 1443178 A2 | 8/2004 | |
| EP | 1503038 A1 | 2/2005 | |

(Continued)

OTHER PUBLICATIONS

International Searching Authority, PCT Notification of Transmittal of the International Search Report for PCT/US2013/067805, Feb. 10, 2014, 9 pages.

(Continued)

*Primary Examiner* — Nathaniel Wiehe
*Assistant Examiner* — Cameron Corday
(74) *Attorney, Agent, or Firm* — Kinney & Lange, P.A.

(57) ABSTRACT

A gas turbine engine component includes an airfoil extending radially from a root section to a tip section and having a trailing edge cooling passageway and first, second and third flow dividers in the cooling passageway. The first, second and third flow dividers have longitudinal axes that are angled based upon a position of the flow divider relative to the tip section of the airfoil.

18 Claims, 6 Drawing Sheets

(56) References Cited

U.S. PATENT DOCUMENTS

| | | |
|---|---|---|
| 7,473,073 B1 | 1/2009 | Liang |
| 7,625,178 B2 | 12/2009 | Morris et al. |
| 7,780,414 B1 | 8/2010 | Liang |
| 7,806,659 B1 * | 10/2010 | Liang .......................... 416/97 R |
| 8,016,564 B1 * | 9/2011 | Liang .......................... 416/97 R |
| 8,052,378 B2 | 11/2011 | Draper |
| 8,070,441 B1 | 12/2011 | Liang |
| 2004/0076519 A1 | 4/2004 | Halfmann et al. |
| 2010/0054915 A1 | 3/2010 | Devore et al. |
| 2010/0074763 A1 | 3/2010 | Liang |
| 2010/0329835 A1 | 12/2010 | Spangler et al. |

FOREIGN PATENT DOCUMENTS

| | | |
|---|---|---|
| EP | 1538305 A2 | 6/2005 |
| EP | 1952911 A1 | 8/2008 |
| WO | 2006025847 A2 | 3/2006 |

OTHER PUBLICATIONS

European Patent Office, extended European search report, Nov. 30, 2015, 8 pages.

* cited by examiner

TRAILING EDGE AND TIP COOLING

BACKGROUND

This invention relates generally to turbomachinery, and specifically to turbine flow path components for gas turbine engines. In particular, the invention relates to cooling techniques for airfoils and other gas turbine engine components exposed to hot working fluid flow.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine component includes an airfoil extending radially from a root section to a tip section and comprising a trailing edge cooling passageway, a plurality of first flow dividers in the cooling passageway, at least one second flow divider in the cooling passageway between the plurality of first flow dividers and the tip section, and a third flow divider in the cooling passageway between the at least one second flow divider and the tip section. The first flow dividers have a first longitudinal axis. The at least one second flow divider has a second longitudinal axis that is offset by a first angle with respect to the first longitudinal axis. The third flow divider has a third longitudinal axis that is offset by a second angle with respect to the first longitudinal axis. The second angle is different from the first angle.

A component for a gas turbine engine includes an airfoil extending radially from an inner diameter to an outer diameter and axially from a leading edge to a trailing edge. The airfoil includes an internal chamber and a plurality of radially spaced cooling slots in communication with the internal chamber. The cooling slots terminate at outlets at the trailing edge. The airfoil also includes a radial column of flow dividers extending between adjacent cooling slots. The column of flow dividers includes a tip flow divider spaced from the outer diameter by a first cooling air slot, an intermediate flow divider spaced from the tip flow divider by a second cooling air slot and a first oblong pedestal spaced from the intermediate flow divider by a third cooling air slot. The intermediate flow divider is oriented at a first angle relative to the oblong pedestal and the tip flow divider is oriented at a second angle relative to the first oblong pedestal. The first angle is different from the second angle.

An airfoil aligned with an axis of rotation includes a leading edge extending along an upstream portion of the airfoil and a trailing edge located axially downstream from the leading edge. First and second inner surfaces define a cooling passageway that extends upstream from the trailing edge. The airfoil also includes a plurality of flow dividers, each flow divider extending from the first inner surface to the second inner surface and having a longitudinal axis, where the longitudinal axis of a given flow divider is angled relative to the axis of rotation based on a position of the flow divider relative to the outer diameter of the airfoil.

DETAILED DESCRIPTION

Figure 1:
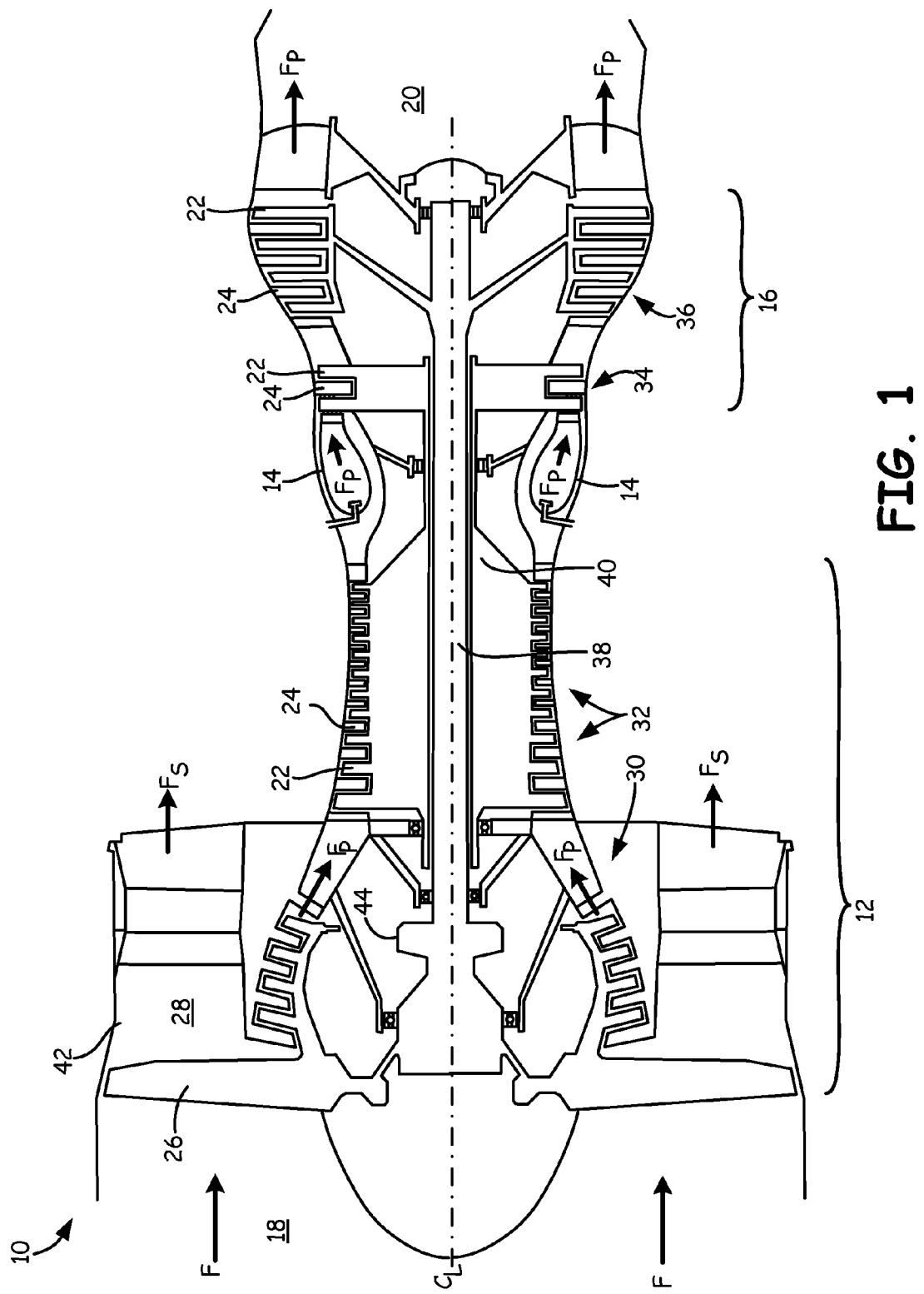
FIG. 1 is a cross-sectional view of a gas turbine engine.

FIG. 1 is a cross-sectional view of gas turbine engine 10. Gas turbine engine 10 includes a power core with compressor 12, combustor 14 and turbine 16 arranged in flow series between upstream inlet 18 and downstream exhaust 20. Compressor 12 and turbine 16 are arranged into a number of alternating stages of rotor blades 22 and stator vanes 24.

In the turbofan configuration of FIG. 1, fan 26 is positioned in bypass duct 28, which is coaxially oriented about the engine core along centerline (or turbine axis) $C_L$. Fan 26 may also have an open-rotor configuration, with gas turbine engine 10 operating as a turboprop or unducted turbofan engine. Alternatively, fan 26 and bypass duct 28 may be absent, with gas turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include blades 22, vanes 24 and other gas turbine engine components exposed to hot gas flow.

In the two-spool, high bypass configuration of FIG. 1, compressor 12 includes low pressure compressor (LPC) 30 and high pressure compressor (HPC) 32, and turbine 16 includes high pressure turbine (HPT) 34 and low pressure turbine (LPT) 36. Low pressure compressor 30 is rotationally coupled to low pressure turbine 36 via low pressure shaft 38, forming the LP spool or low spool. High pressure compressor 32 is rotationally coupled to high pressure turbine 34 via high pressure shaft 40, forming the HP spool or high spool.

Flow F at inlet 18 divides into primary (core) flow $F_P$ and secondary (bypass) flow $F_S$ downstream of fan 26. Fan 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust 20, which can be shaped or actuated to regulate the exhaust flow and improve thrust performance.

Low pressure shaft 38 and high pressure shaft 40 are mounted coaxially about centerline $C_L$, and rotate at different speeds. Fan 26 is rotationally coupled to low pressure shaft 38. In advanced designs, fan drive gear system 44 is provided for additional fan speed control, improving thrust performance and efficiency with reduced noise output.

Fan 26 may also function as a first-stage compressor for gas turbine engine 10, and LPC 30 may be configured as an intermediate compressor or booster. Alternatively, fan 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor 12, for example at the outlet of high pressure compressor 32, entering combustor 14. Higher pressure ratios, however, also result in greater gas path temperatures, increasing the cooling loads on blades 22, vanes 24 and other components of gas turbine engine 10. To reduce operating temperatures, increase service life and maintain engine efficiency, these components are provided with improved cooling configurations, as described below. Suitable components include, but not limited to, cooled gas turbine engine components in compressors 30 and 32, combustor 14, turbines 34 and 36, and exhaust 20 of gas turbine engine 10.

Figure 2:
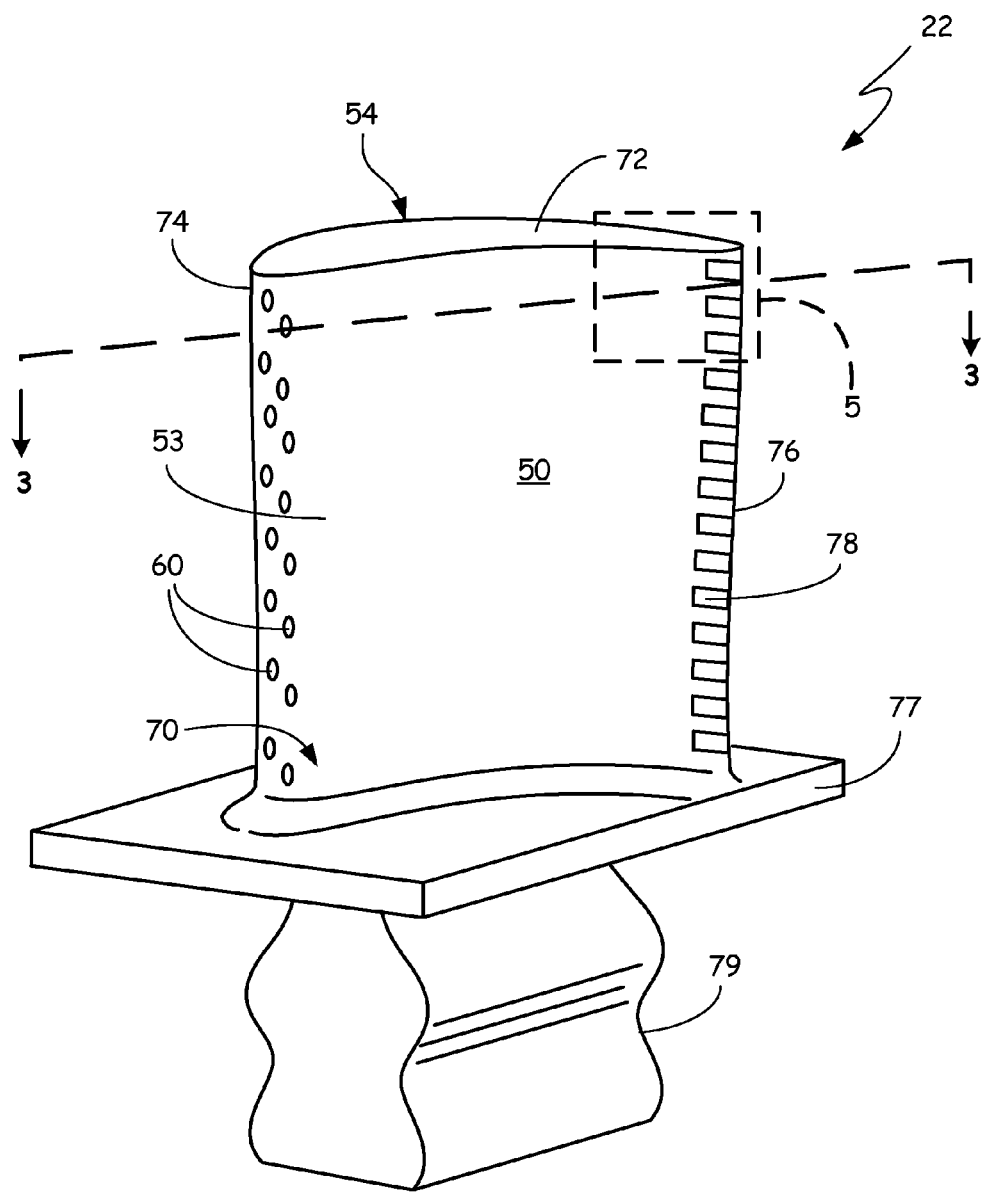
FIG. 2 is a perspective view of a rotor blade.
Figure 3:
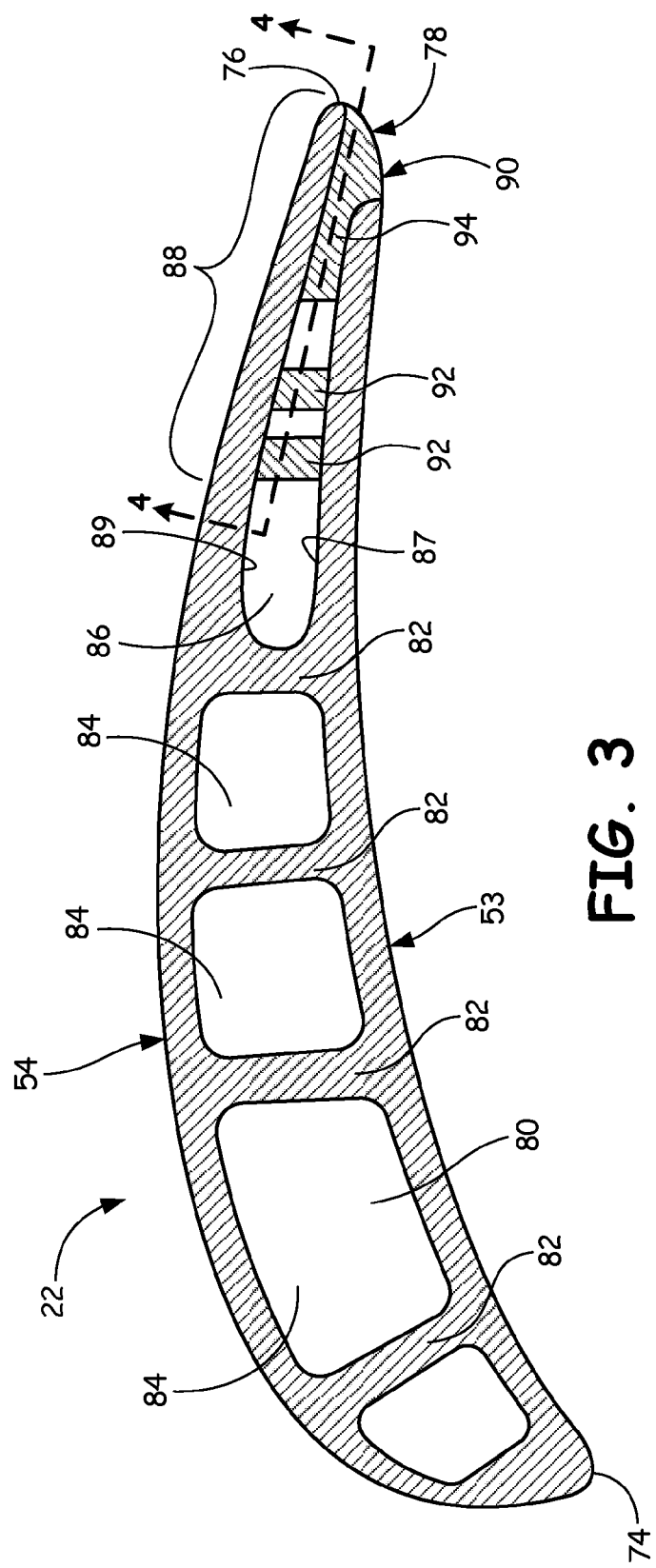
FIG. 3 is an axial cross-sectional view of the rotor blade from FIG. 2.

FIG. 2 is a perspective view of one embodiment of rotor blade 22, and FIG. 3 is a cross-sectional view of rotor blade 22 taken along line 3-3 in FIG. 2. Rotor blade 22 includes airfoil 50 having root section 70, tip section 72, leading edge 74, trailing edge 76, pressure side wall 53, suction side wall 54 and cooling outlets 78. Rotor blade 22 also includes platform 77 and blade root 79. As shown in FIG. 3, airfoil 50 also includes cavity 80, internal walls 82, cooling passageways 84 and 86, trailing edge region 88, cut-back 90, pedestals 92, and flow dividers 94. Cooling passageways 84 provide cooling fluid for leading edge 74 and a mid-chord region of airfoil 50, while cooling passageway 86 provides cooling fluid for trailing edge region 88 of airfoil 50.

Airfoil 50 extends axially from leading edge 74 to trailing edge 76, with trailing edge 76 located downstream of leading edge 74. Pressure side wall 53 and suction side wall 54 form the major opposing surfaces or walls of airfoil 50. Pressure side wall 53 and suction side wall 54 both extend axially between leading edge 74 and trailing edge 76, and radially from root section 70 to tip section 72. A column of cooling outlets 78 extend radially from root section 70 to tip section 72 at trailing edge 76 of airfoil 50. Additional cooling holes 60 can also be located on airfoil 50.

Pressure side wall 53 and suction side wall 54 join leading edge 74 to trailing edge 76 and define a hollow, central cavity 80 of airfoil 50. A plurality of internal walls 82 extend transversely across cavity 80 from pressure side wall 53 to suction side wall 54 and connect pressure side wall 53 to suction side wall 54. Internal walls 82 divide cavity 80 into a plurality of cooling passageways 84 that extend through a majority of airfoil 50. Cooling passageways 84 are spaced axially from a location near leading edge 74, through a mid-chord region, to trailing edge region 88. Cooling passageways 84 can be straight or serpentine and can take a plurality of different shapes. Cooling fluid (e.g., compressor air) flows radially through cooling passageways 84 to cool airfoil 50.

As shown in FIG. 3, trailing edge region 88 has its own cooling scheme including cooling passageway 86. Cooling passageway 86 is an open area located in trailing edge region 88 of airfoil 50. Cooling passageway 86 generally extends between root section 70 and tip section 72 and is bounded axially by internal wall 82 and trailing edge 76, and bounded transversely by first inner surface 87 and second inner surface 89. First inner surface 87 is the inner surface of pressure side wall 53 of airfoil 50 and faces cooling passageway 86. Second inner surface 89 is the inner surface of suction side wall 54 of airfoil 50 and faces cooling passageway 86. First inner surface 87 and second inner surface are located on generally opposite sides of cooling passageway 86.

In some embodiments, trailing edge region 88 includes cut-back 90 located near trailing edge 76 of airfoil 50. Cut-back 90 is formed by terminating pressure side wall 53 prior to terminating suction side wall 54, such that suction side wall 54 extends axially beyond pressure side wall 53 at trailing edge 76. However, an alternate embodiment utilizing this invention is a center discharge trailing edge, where the pressure side wall 53 terminates at the same location as suction side wall 54.

Extending transversely across cooling passageway 86 is a plurality of pedestals 92. Pedestals 92 extend from first inner surface 87 to second inner surface 89 within cooling passageway 86. While pedestals 92 are shown and described with reference to rotor blade 22 airfoil configuration, they are equally applicable to a stator vane airfoil configuration (e.g., stator vane 24 shown in FIG. 1). Similarly, flow dividers 94 extend transversely across cooling passageway 86 from first inner surface 87 to second inner surface 89 within cooling passageway 86. In some embodiments, flow dividers 94 extend axially across the region near cut-back 90. While flow dividers 94 are shown and described with reference to rotor blade 22 airfoil configuration, they are equally applicable to a stator vane airfoil configuration (e.g., stator vane 24 shown in FIG. 1). The structure and function of flow dividers 94 are described in detail below with reference to FIGS. 4-6.

Figure 4:
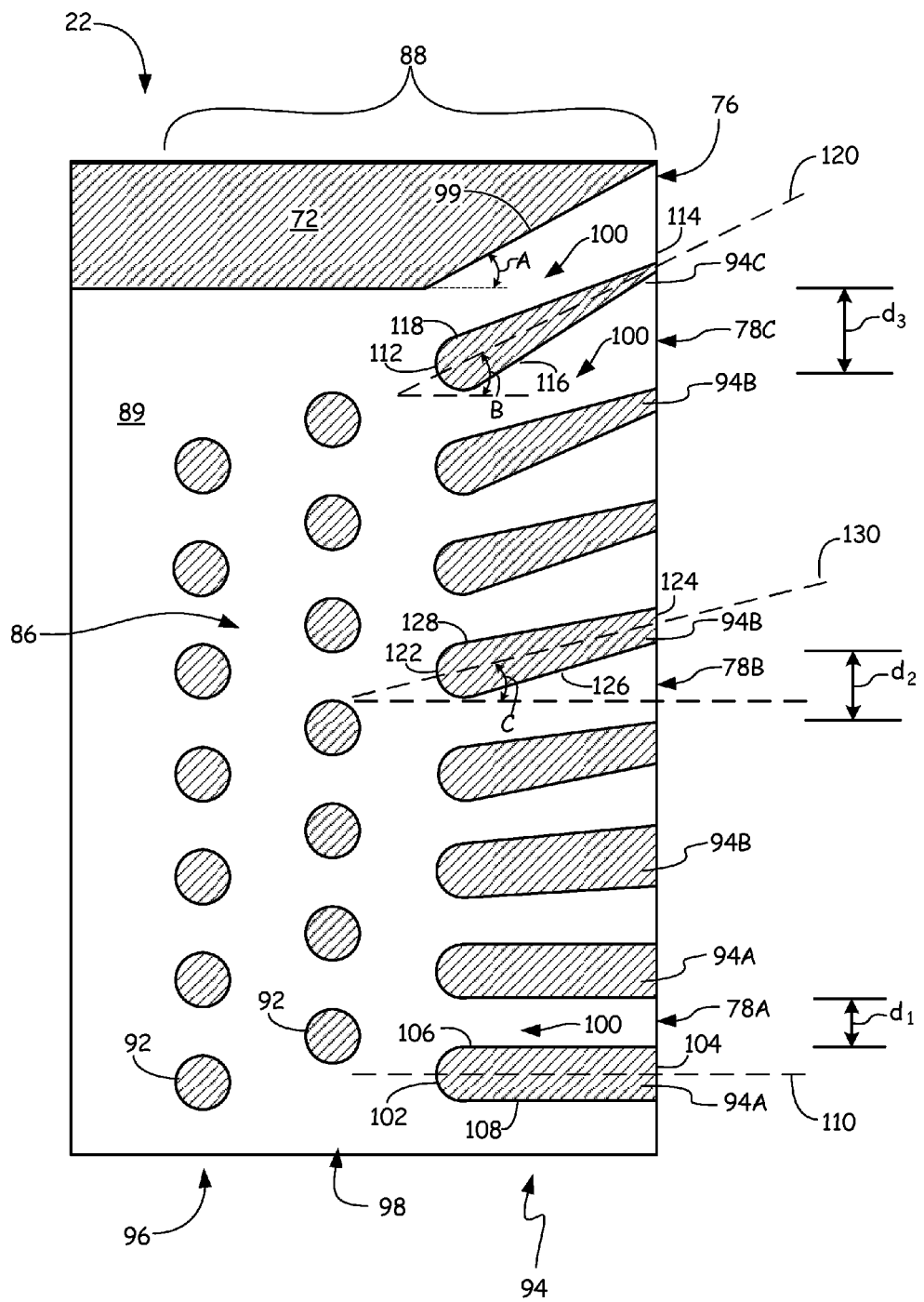
FIG. 4 is an enlarged side view of a trailing edge section of the rotor blade from FIG. 3 with a pressure side surface removed showing one embodiment of a cooling scheme.

FIG. 4 is a radial cross-sectional view of airfoil 50 of rotor blade 22 of FIG. 3 taken along the line 4-4, which shows one embodiment of a cooling scheme for trailing edge region 88. Airfoil 50 includes trailing edge 76, trailing edge region 88, cooling passageway 86, cooling outlet 78, pedestals 92 arranged in first column 96 and second column 98 and flow dividers 94.

As described above with reference to FIGS. 2 and 3, trailing edge 76 is the most axially downstream aspect of airfoil 50. As shown in FIG. 4, trailing edge 76 is the terminal portion of trailing edge region 88. Cooling passageway 86 is a generally open or hollow area defined within trailing edge region 88 that terminates with cooling outlet 78 at trailing edge 76. Cooling outlet 78 is open and continuous along trailing edge 76. Located within cooling passageway 86 is a plurality of pedestals 92. Pedestals 92 extend from first inner surface 87 to second inner surface 89 within cooling passageway 86. Pedestals 92 can be cylindrical in shape and circular in cross section such that each has a diameter, though other shaped cross sections are contemplated. Pedestals 92 can be arranged into vertical or radial columns.

First column 96 and second column 98 are more or less identical in that they both include pedestals 92 with substantially uniform sizing and spacing. Pedestals 92 of second column 98 can be offset from pedestals 92 of first column 96 so that a space between pedestals 92 of second column 98 is axially aligned with a pedestal 92 of first column 96 and vice versa. Pedestals 92 add convective heat transfer surface area to trailing edge region 88, while partially blocking cooling fluid flow. The cooling fluid travels axially across cooling passageway 86 through spaces or slots between pedestals 92.

Flow dividers 94A, 94B and 94C (collectively referred to as "flow dividers 94") further shape the flow of cooling fluid in trailing edge region 88. Flow dividers 94 keep cooling fluid flow separated for ejection at trailing edge 76. Like pedestals 92, flow dividers 94 extend from first inner surface 87 to second inner surface 89 within cooling passageway 86. As shown in FIG. 4, flow dividers 94 extend generally axially from cooling passageway 86 to trailing edge 76. Flow dividers 94 are arranged in a radial column within trailing edge region 88. Flow passages 100 are formed between adjacent flow dividers 94, allowing cooling fluid to flow through cooling passageway 86, around flow dividers 94 and through flow passages 100 to exit airfoil 50 through cooling outlets 78. As described below in further detail, each flow dividers 94 is shaped and angled according to its radial position along trailing edge 76. The shape and angle of flow dividers 94 transitions from tip section 72 towards root section 70.

FIG. 4 illustrates first flow dividers 94A, second flow dividers 94B and third flow dividers 94C. First flow dividers (oblong pedestals) 94A are located closer to root section 70 than tip section 72, second flow dividers (intermediate flow dividers) 94B are located between first flow dividers 94A and tip section 72 and third flow dividers (tip flow dividers) 94C are located between second flow dividers 94B and tip section 72.

First flow dividers 94A are pedestals that are elongated axially to be oblong in shape. Flow dividers 94A are described in greater detail in U.S. patent application Ser. No. 13/424,752, filed on Mar. 20, 2012 and entitled "Trailing edge cooling", which is incorporated by reference. Upstream end 102 of each flow divider 94A appears semi-circular in cross section while downstream end 104 is generally rectangular in cross section. Two substantially parallel walls (106 and 108) connect upstream end 102 to downstream end 104 and form right angles with downstream end 104. Flow divider 94A includes longitudinal axis 110 that is generally parallel to walls 106 and 108. Longitudinal axis 110 is generally parallel with the axis of rotation of airfoil 50 (e.g., engine centerline $C_L$ shown in FIG. 1). Upstream end 102 of each flow divider 94A has a diameter, which can be similar or equal to the diameter of pedestals 92. In the depicted embodiment, upstream end 102 of each flow divider 94A has a diameter of about 0.43 millimeters (0.017 inches), although the disclosure is not so limited. Flow dividers 94A can be radially aligned with one or more of the columns of pedestals 92. In some embodiments, adjacent flow dividers 94A are evenly spaced in the radial direction by distance $d_1$.

In the embodiment shown in FIG. 4, third flow divider 94C is a teardrop shaped pedestal located near tip section 72. Flow divider 94C is described in greater detail in U.S. patent application Ser. No. 13/424,765, filed on Mar. 20, 2012 and entitled "Trailing edge or tip flag antiflow operation", which is incorporated by reference. Tip corner 99 forms angle A with a line drawn parallel to the axis of rotation of airfoil 50. Angle A is generally between about 15-25 degrees. In the depicted embodiment, angle A is about 20 degrees. Flow divider 94C is the flow divider nearest tip corner 99. Upstream end 112 of third flow divider 94C appears semi-circular in cross section while downstream end 114 is pointed and generally triangular in cross-section. Walls 116 and 118 connect upstream end 112 to downstream end 114 and converge until they meet at downstream end 114. Flow divider 94C includes longitudinal axis 120 that traces the centerline of flow divider 94C (i.e. a line that is equidistant from walls 116 and 118). Longitudinal axis 120 forms angle B with a line drawn parallel to the axis of rotation of airfoil 50. Angle B is generally smaller than angle A.

Second flow dividers 94B are located between the first flow divider 94A nearest tip section 72 and third flow divider 94C. Second flow dividers 94B represent the transition from teardrop shaped and angled flow divider 94C to oblong flow divider 94A that is generally parallel with the axis of rotation of airfoil 50. The number of second flow dividers 94B present along trailing edge 76 can vary. In some embodiments, between two and ten second flow dividers 94B will be present between flow divider 94C and the first flow divider 94A.

In the embodiment shown in FIG. 4, upstream end 122 of second flow divider 94B appears semi-circular in cross section while downstream end 124 is a tapering irregular shape in cross-section. Walls 126 and 128 connect upstream end 122 to downstream end 124 and converge until they reach downstream end 124 at trailing edge 76. Unlike flow divider 94C, walls 126 and 128 do not converge to meet at downstream end 124. As a result, walls 126 and 128 of flow divider 94B converge at a lesser rate than walls 116 and 118 of flow divider 94C. In other words, the radial thickness (the distance between wall 126 and wall 128) of flow divider 94B at a given axial location is greater than the radial thickness of flow divider 94C. Flow divider 94B includes longitudinal axis 130 that traces the centerline of flow divider 94B (i.e. a line that is equidistant from walls 116 and 118). Longitudinal axis 130 forms angle C with a line drawn parallel to the axis of rotation of airfoil 50. Angle C is generally smaller than angle B.

As shown in FIG. 4, the shape and angle of flow dividers 94B vary depending on the location of flow divider 94B along trailing edge 76. For example, the flow divider 94B located just under third flow divider 94C possesses more of a teardrop shape and a longitudinal axis with a sharper angle relative to the axis of rotation than the flow divider 94B located just above first flow divider 94A. As shown in FIG. 4, flow dividers 94 transition in shape and relative angle from tip section 72 towards root section 70.

In the embodiment shown in FIG. 4, the size of cooling outlets 78 between adjacent flow dividers 94 varies. As shown, distance $d_1$ represents the height of outlet 78A between adjacent first flow dividers 94A. Distance $d_2$ represents the height of outlet 78B between adjacent second flow dividers 94B. Distance $d_2$ is greater than distance $d_1$ meaning that outlet 78B has a greater height than outlet 78A. Distance $d_3$ represents the height of outlet 78C between topmost second flow divider 94B and third flow divider 94C. Distance $d_3$ is greater than distance $d_2$ meaning that outlet 78C has a greater height than outlet 78B and outlet 78A. In some embodiments, distance $d_3$ is about 20 percent to about 50 percent larger than distance $d_1$. In some embodiments, the distance between upstream ends of adjacent flow dividers 94 is substantially equal for all flow dividers 94.

The teardrop shaped and angled third flow divider 94C helps prevent separation of the cooling fluid flow near tip section 72. The oblong pedestal first flow dividers 94A provide a uniform injection of cooling fluid from trailing edge 76, minimizing losses due to the mixing of different airstreams within cooling passageway 86. By transitioning the shape and angle of flow dividers 94 from the angled teardrop shape to the parallel oblong shape, the arrangement of flow dividers 94 both prevents separation of the cooling fluid flow near the tip of airfoil 50 and provides a uniform injection of cooling fluid along the midspan region of airfoil 50.

Figure 5:
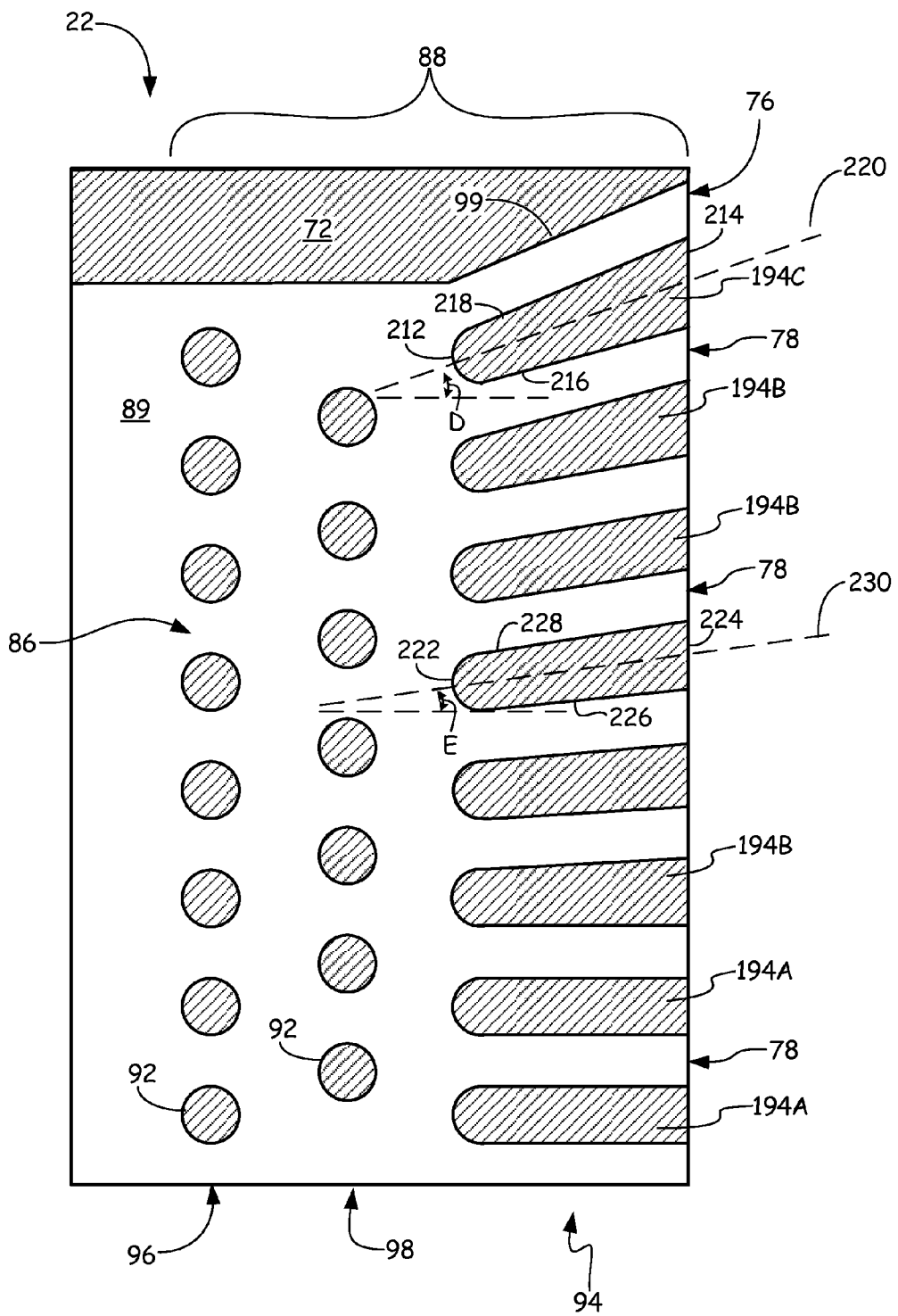
FIG. 5 is an enlarged side view of a trailing edge section of the rotor blade from FIG. 3 with a pressure side surface removed showing another embodiment of a cooling scheme.

FIG. 5 is a radial cross-sectional view of airfoil 50 showing another embodiment of a cooling scheme for trailing edge region 88. As in FIG. 4, flow dividers 194 are located along trailing edge 76 to further shape the flow of cooling fluid in trailing edge region 88. First flow dividers 194A are shaped and function the same as flow dividers 94A described above. Second flow dividers 194B and third flow divider 194C are shaped differently than their counterparts shown in FIG. 4. In this embodiment, cooling outlets 78 between adjacent flow dividers 194 all have substantially the same height. That is, the radial distance between adjacent flow dividers, regardless of type (i.e. 194A, 194B or 194C), is the same. This creates a column of outlets 78 along trailing edge 76 that allow substantially uniform cooling fluid flow. In order for outlets 78 to have substantially the same height, second flow dividers 194B and third flow divider 194C do not taper to form a teardrop shape. Instead the walls of second flow dividers 194B and third flow divider 194C diverge from the upstream end to the downstream end of the flow divider.

For example, upstream end 212 of third flow divider 194C appears semi-circular in cross section while downstream end 214 is an irregular shape in cross-section. Walls 216 and 218 connect upstream end 212 to downstream end 214 and diverge until they reach downstream end 214 at trailing edge 76. Flow divider 194C includes longitudinal axis 220 that traces the centerline of flow divider 194C (i.e. a line that is equidistant from walls 216 and 218). Longitudinal axis 220 forms angle D with a line drawn parallel to the axis of rotation of airfoil 50. Similarly, upstream end 222 of second flow divider 194B appears semi-circular in cross section while downstream end 224 is an irregular shape in cross-section. Walls 226 and 228 connect upstream end 222 to downstream end 224 and diverge until they reach downstream end 224 at trailing edge 76. Flow divider 194B includes longitudinal axis 230 that traces the centerline of flow divider 194B (i.e. a line that is equidistant from walls 226 and 228). Longitudinal axis 230 forms angle E with a line drawn parallel to the axis of rotation of airfoil 50. Angle E is generally smaller than angle D.

By allowing the tip and intermediate flow dividers to diverge from their upstream ends towards their downstream ends, the outlets for cooling fluid can be made uniform so that a uniform flow of cooling air is expelled from the outlets along the trailing edge.

Figure 6:
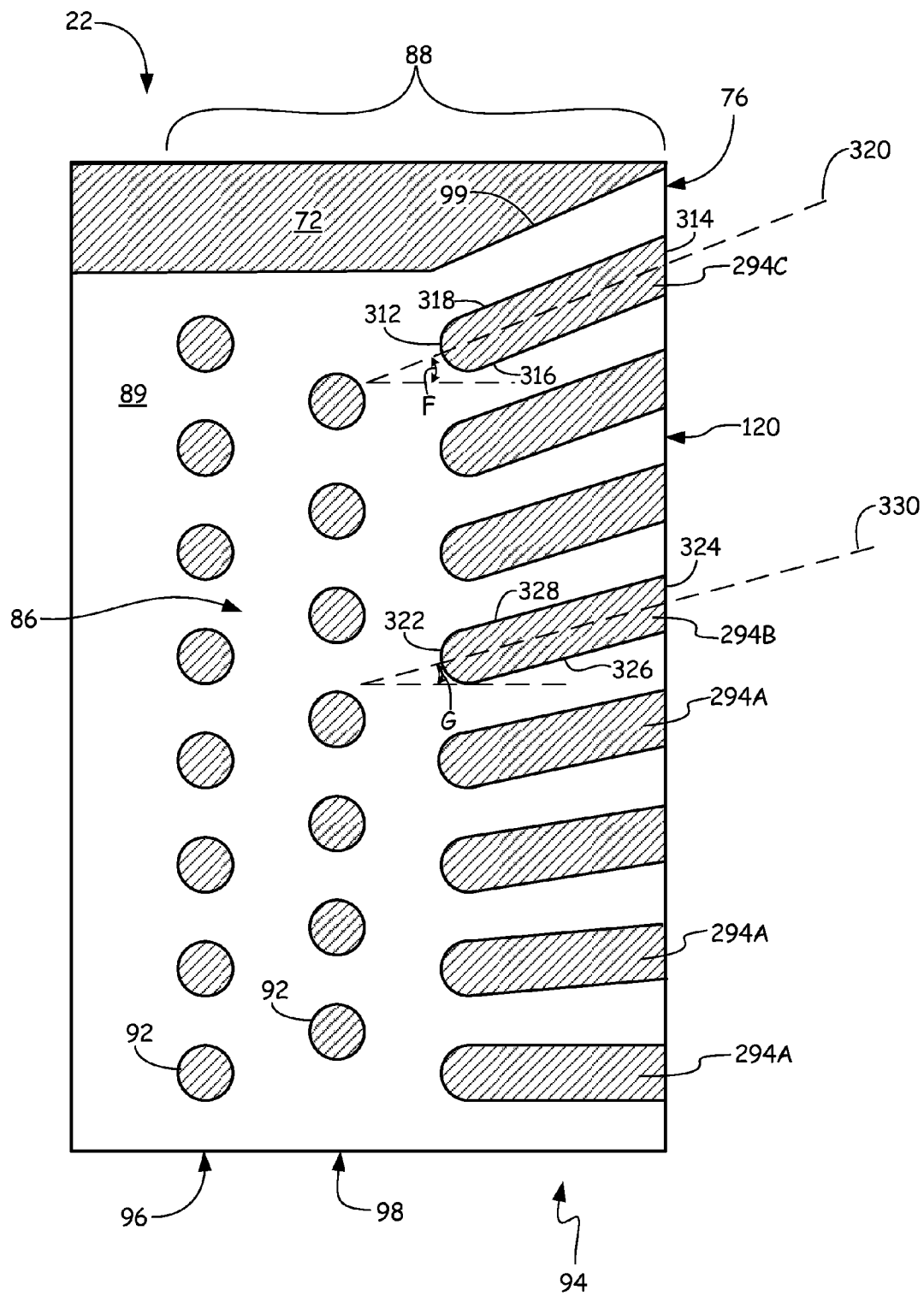
FIG. 6 is an enlarged side view of a trailing edge section of the rotor blade from FIG. 3 with a pressure side surface removed showing a third embodiment of a cooling scheme.

FIG. 6 is a radial cross-sectional view of airfoil 50 showing a third embodiment of a cooling scheme for trailing edge region 88. As in FIGS. 4 and 5, flow dividers 294 are located along trailing edge 76 to further shape the flow of cooling fluid in trailing edge region 88. In this embodiment, the upstream and downstream ends of each flow divider 294 are connected by walls that are substantially parallel to one another. That is, each flow divider is shaped as an oblong pedestal as described above with respect to first flow dividers 94A. Here, however, flow dividers 294 are angled from the axis of rotation depending on their radial location along trailing edge 76.

For example, upstream end 312 of third flow divider 294C appears semi-circular in cross section while downstream end 314 is an irregular shape in cross-section. Walls 316 and 318 connect upstream end 312 to downstream end 314 and are substantially parallel to one another. Flow divider 294C includes longitudinal axis 320 that traces the centerline of flow divider 294C (i.e. a line that is equidistant from walls 316 and 318). Longitudinal axis 320 forms angle F with a line drawn parallel to the axis of rotation of airfoil 50. Similarly, upstream end 322 of second flow divider 294B appears semi-circular in cross section while downstream end 324 is an irregular shape in cross-section. Walls 326 and 328 connect upstream end 322 to downstream end 324 and are substantially parallel to one another. Flow divider 294B includes longitudinal axis 360 that traces the centerline of flow divider 294B (i.e. a line that is equidistant from walls 326 and 328). Longitudinal axis 360 forms angle G with a line drawn parallel to the axis of rotation of airfoil 50. Angle G is generally smaller than angle F.

By providing each of the flow dividers with the same basic shape, the manufacturing complexity of airfoil 50 can be reduced.

While the above embodiments have been described with respect to rotor blade 22, embodiments of the invention can also be applied to the trailing edge of stator vanes.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

Discussion of Possible Embodiments

The following are non-exclusive descriptions of possible embodiments of the present invention.

A gas turbine engine component includes an airfoil extending radially from a root section to a tip section and comprising a trailing edge cooling passageway, a plurality of first flow dividers in the cooling passageway, at least one second flow divider in the cooling passageway between the plurality of first flow dividers and the tip section, and a third flow divider in the cooling passageway between the at least one second flow divider and the tip section. The first flow dividers have a first longitudinal axis. The at least one second flow divider has a second longitudinal axis that is offset by a first angle with respect to the first longitudinal axis. The third flow divider has a third longitudinal axis that is offset by a second angle with respect to the first longitudinal axis. The second angle is different from the first angle.

The component of the preceding paragraph can optionally include, additionally and/or alternatively any, one or more of the following features, configurations and/or additional components:

The second angle can be larger than the first angle.

The first flow dividers can be axially elongated oblong pedestals.

The at least one second flow divider can include an upstream end and a downstream end, and a radial thickness of the at least one second flow divider can decrease from the upstream end to the downstream end.

The third flow divider can include an upstream end and a downstream end, and a radial thickness of the third flow divider can decrease from the axial upstream end to the axial downstream end at a rate greater than the radial thickness of the at least one second flow divider decreases from its upstream end to its downstream end.

The component can further include a first flow passage formed between adjacent first flow dividers, the adjacent first flow dividers spaced by a first distance; a second flow passage formed between the at least one second flow divider and a nearest first flow divider, the nearest first flow divider and the second flow divider spaced by a second distance greater than the first distance; and a third flow passage formed between the third flow divider and a nearest second flow divider, the nearest second flow divider and the third flow divider spaced by a third distance greater than the second distance.

The at least one second flow divider can include an upstream end and a downstream end, and a radial thickness of the second flow divider can increase from the upstream end to the downstream end.

The third flow divider can include an upstream end and a downstream end, and a radial thickness of the third flow divider can increase from the axial upstream end to the axial downstream end.

The component can further include a first flow passage formed between adjacent first flow dividers, the adjacent first flow dividers spaced by a first distance; a second flow passage formed between the at least one second flow divider and a nearest first flow divider, the nearest first flow divider and the second flow divider spaced by a second distance substantially equal to the first distance; and a third flow passage formed between the third flow divider and a nearest second flow divider, the nearest second flow divider and the third flow divider spaced by a third distance substantially equal to the second distance.

The at least one second flow divider can include an upstream end and a downstream end, and the upstream end and the downstream end can be connected by two substantially parallel sides.

The third flow divider can include an upstream end and a downstream end, and the upstream end and the downstream end of the third flow divider can be connected by two substantially parallel sides.

The third flow divider can be adjacent the tip section of the airfoil.

A component for a gas turbine engine includes an airfoil extending radially from an inner diameter to an outer diameter and axially from a leading edge to a trailing edge. The airfoil includes an internal chamber and a plurality of radially spaced cooling slots in communication with the internal chamber. The cooling slots terminate at outlets at the trailing edge. The airfoil also includes a radial column of flow dividers extending between adjacent cooling slots. The column of flow dividers includes a tip flow divider spaced from the outer diameter by a first cooling air slot, an intermediate flow divider spaced from the tip flow divider by a second cooling air slot and a first oblong pedestal spaced from the intermediate flow divider by a third cooling air slot. The intermediate flow divider is oriented at a first angle relative to the oblong pedestal and the tip flow divider is oriented at a second angle relative to the first oblong pedestal. The first angle is different from the second angle.

The component of the preceding paragraph can optionally include, additionally and/or alternatively any, one or more of the following features, configurations and/or additional components:

The second angle can be larger than the first angle.

The intermediate flow divider can include an upstream end and a downstream end, and a radial thickness of the intermediate flow divider can decrease from the upstream end to the downstream end.

The tip flow divider can include an upstream end and a downstream end, and a radial thickness of the tip flow divider can decrease from the axial upstream end to the axial downstream end at a rate greater than the radial thickness of intermediate flow divider decreases from its upstream end to its downstream end.

The tip flow divider and the intermediate flow divider can be spaced by a first distance, and the intermediate flow divider and the oblong pedestal can be spaced by a second distance smaller than the first distance.

The intermediate flow divider can include an upstream end and a downstream end, and a radial thickness of the intermediate flow divider can increase from the upstream end to the downstream end.

The tip flow divider can include an upstream end and a downstream end, and a radial thickness of the tip flow divider can increase from the axial upstream end to the axial downstream end.

The tip flow divider and the intermediate flow divider can be spaced by a first distance, and the intermediate flow divider and the oblong pedestal can be spaced by a second distance substantially equal to the first distance.

The intermediate flow divider can include an upstream end and a downstream end, and the upstream end and the downstream end can be connected by two substantially parallel sides.

The tip flow divider can include an upstream end and a downstream end, and the upstream end and the downstream end of the tip flow divider can be connected by two substantially parallel sides.

An airfoil aligned with an axis of rotation includes a leading edge extending along an upstream portion of the airfoil and a trailing edge located axially downstream from the leading edge. First and second inner surfaces can define a cooling passageway that extends upstream from the trailing edge. A plurality of flow dividers, each flow divider extending from the first inner surface to the second inner surface, can have a longitudinal axis where the longitudinal axis of a given flow divider is angled relative to the axis of rotation based on a position of the flow divider relative to the outer diameter of the airfoil.

The invention claimed is:

1. A gas turbine engine component comprising:
   an airfoil extending radially from a root section to a tip section and comprising a trailing edge cooling passageway;
   a plurality of first flow dividers in the cooling passageway, the first flow dividers having a first longitudinal axis, wherein the first flow dividers are axially elongated oblong pedestals and each of the first flow dividers comprises an upstream end and a downstream end, and wherein the upstream end and the downstream end of each first flow divider are connected by two substantially parallel sides;

at least one second flow divider in the cooling passageway between the plurality of first flow dividers and the tip section, the at least one second flow divider having a second longitudinal axis that is offset by a first angle with respect to the first longitudinal axis, wherein the at least one second flow divider comprises an upstream end and a downstream end, and wherein the upstream end and the downstream end are connected by two sides that are substantially straight, and wherein the radial thickness of the at least one second flow divider decreases from the upstream end to the downstream end;

a third flow divider in the cooling passageway between the at least one second flow divider and the tip section, the third flow divider having a third longitudinal axis that is offset by a second angle with respect to the first longitudinal axis, wherein the second angle is different from the first angle.

2. The component of claim 1, wherein the second angle is larger than the first angle.

3. The component of claim 1, wherein the third flow divider comprises an upstream end and a downstream end, and wherein a radial thickness of the third flow divider decreases from the upstream end to the downstream end at a rate greater than the radial thickness of the at least one second flow divider decreases from its upstream end to its downstream end.

4. The component of claim 3, further comprising:
a first flow passage formed between adjacent first flow dividers, the adjacent first flow dividers spaced by a first distance;
a second flow passage formed between the at least one second flow divider and a nearest first flow divider, the nearest first flow divider and the second flow divider spaced by a second distance greater than the first distance; and
a third flow passage formed between the third flow divider and a nearest second flow divider, the nearest second flow divider and the third flow divider spaced by a third distance greater than the second distance.

5. The component of claim 1, wherein the third flow divider is adjacent the tip section of the airfoil.

6. A gas turbine engine component comprising:
an airfoil extending radially from a root section to a tip section and comprising a trailing edge cooling passageway;
a plurality of first flow dividers in the cooling passageway, the first flow dividers having a first longitudinal axis, wherein the first flow dividers are axially elongated oblong pedestals and each of the first flow dividers comprises an upstream end and a downstream end, and wherein the upstream end and the downstream end of each first flow divider are connected by two substantially parallel sides;
at least one second flow divider in the cooling passageway between the plurality of first flow dividers and the tip section, the at least one second flow divider having a second longitudinal axis that is offset by a first angle with respect to the first longitudinal axis, wherein the at least one second flow divider comprises an upstream end and a downstream end, and wherein the upstream end and the downstream end are connected by two sides that are substantially straight, and wherein the radial thickness of the at least one second flow divider decreases from the upstream end to the downstream end or stays substantially constant from the upstream end to the downstream end;
a third flow divider in the cooling passageway between the at least one second flow divider and the tip section, wherein the third flow divider comprises an upstream end and a downstream end, and wherein the radial thickness of the third flow divider increases from the axial upstream end to the axial downstream end; the third flow divider having a third longitudinal axis that is offset by a second angle with respect to the first longitudinal axis, wherein the second angle is different from the first angle.

7. The component of claim 6, further comprising:
a first flow passage formed between adjacent first flow dividers, the adjacent first flow dividers spaced by a first distance;
a second flow passage formed between the at least one second flow divider and a nearest first flow divider, the nearest first flow divider and the second flow divider spaced by a second distance substantially equal to the first distance; and
a third flow passage formed between the third flow divider and a nearest second flow divider, the nearest second flow divider and the third flow divider spaced by a third distance substantially equal to the second distance.

8. The component of claim 6, wherein the at least one second flow divider comprises an upstream end and a downstream end, and wherein the upstream end and the downstream end are connected by two substantially parallel sides.

9. The component of claim 6, wherein the second angle is larger than the first angle.

10. The component of claim 6, wherein the third flow divider is adjacent the tip section of the airfoil.

11. The component of claim 6, wherein the at least one second flow divider comprises an upstream end and a downstream end, and wherein a radial thickness of the at least one second flow divider increases from the upstream end to the downstream end.

12. A component for a gas turbine engine comprising:
an airfoil extending radially from an inner diameter to an outer diameter and axially from a leading edge to a trailing edge, the airfoil comprising:
an internal chamber;
a plurality of radially spaced cooling slots in communication with the internal chamber, the cooling slots terminating at outlets at the trailing edge; and
a radial column of flow dividers extending between adjacent cooling slots, the column of flow dividers comprising:
a tip flow divider spaced from the outer diameter by a first cooling air slot;
an intermediate flow divider spaced from the tip flow divider by a second cooling air slot; wherein the intermediate flow divider comprises an upstream end and a downstream end, and wherein the upstream end and the downstream end are connected by two sides that are substantially straight, and wherein the radial thickness of the intermediate flow divider decreases from the upstream end to the downstream end; and
a first axially elongated oblong pedestal spaced from the intermediate flow divider by a third cooling air slot, wherein the intermediate flow divider is oriented at a first angle relative to the first oblong pedestal, and wherein the tip flow divider is oriented at a second angle relative to the first oblong pedestal, and wherein the first angle is different from the second angle.

13. The component of claim 12, wherein the second angle is larger than the first angle.

14. The component of claim 12, wherein the tip flow divider comprises an upstream end and a downstream end, and wherein a radial thickness of the tip flow divider decreases from the upstream end to the downstream end at a rate greater than the radial thickness of the intermediate flow divider decreases from its upstream end to its downstream end.

15. The component of claim 14, wherein the tip flow divider and the intermediate flow divider are spaced by a first distance, and wherein the intermediate flow divider and the oblong pedestal are spaced by a second distance smaller than the first distance.

16. A component for a gas turbine engine comprising:
an airfoil extending radially from an inner diameter to an outer diameter and axially from a leading edge to a trailing edge, the airfoil comprising:
an internal chamber;
a plurality of radially spaced cooling slots in communication with the internal chamber, the cooling slots terminating at outlets at the trailing edge; and
a radial column of flow dividers extending between adjacent cooling slots, the column of flow dividers comprising:
a tip flow divider spaced from the outer diameter by a first cooling air slot;
an intermediate flow divider spaced from the tip flow divider by a second cooling air slot; wherein the intermediate flow divider comprises an upstream end and a downstream end, and wherein the upstream end and the downstream end are connected by two sides that are substantially straight, and wherein the radial thickness of the intermediate flow divider decreases from the upstream end to the downstream end or stays substantially constant from the upstream end to the downstream end; and
a first axially elongated oblong pedestal spaced from the intermediate flow divider by a third cooling air slot, wherein the intermediate flow divider is oriented at a first angle relative to the first oblong pedestal, and wherein the tip flow divider is oriented at a second angle relative to the first oblong pedestal, and wherein the first angle is different from the second angle, wherein the tip flow divider comprises an upstream end and a downstream end, and wherein the radial thickness of the tip divider increases from the upstream end to the downstream end.

17. The component of claim 16, wherein the tip flow divider and the intermediate flow divider are spaced by a first distance, and wherein the intermediate flow divider and the oblong pedestal are spaced by a second distance substantially equal to the first distance.

18. The component of claim 16, wherein the second angle is larger than the first angle.

* * * * *